Patented July 11, 1950

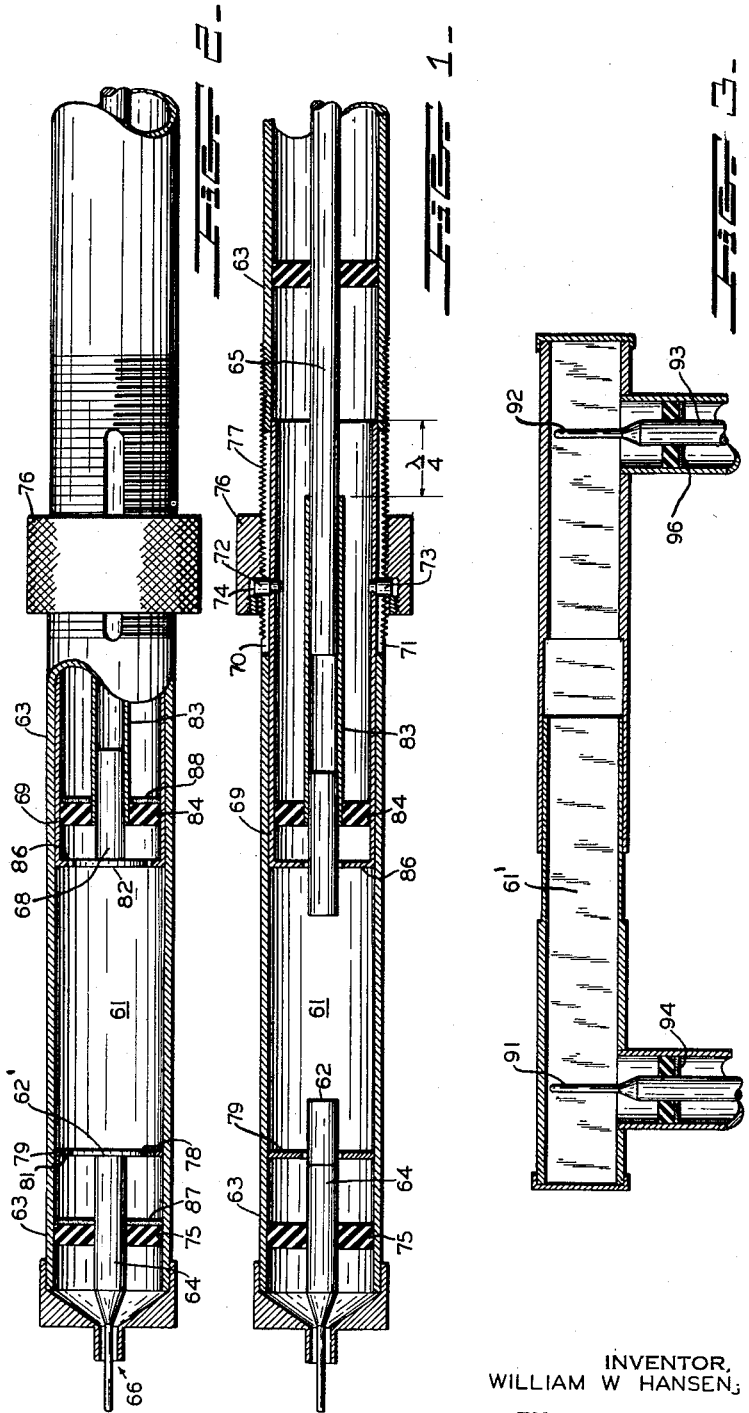

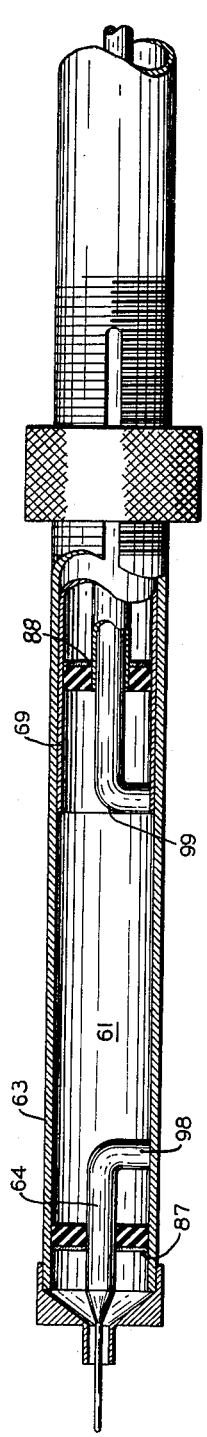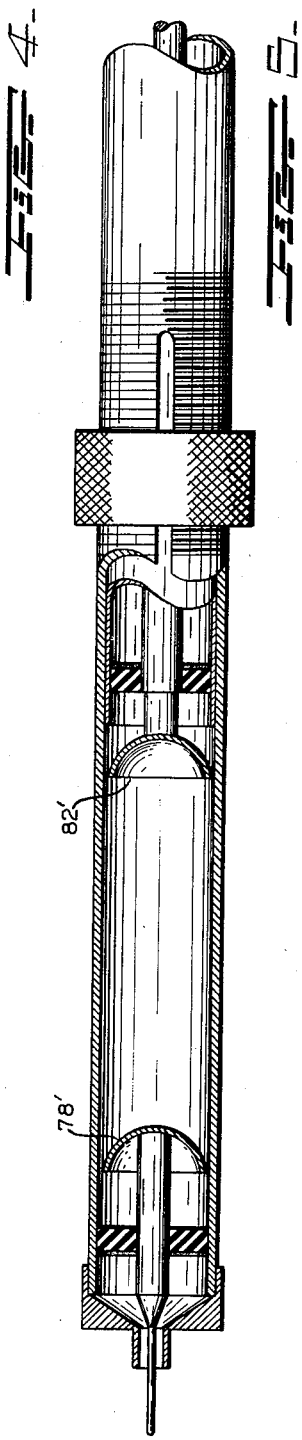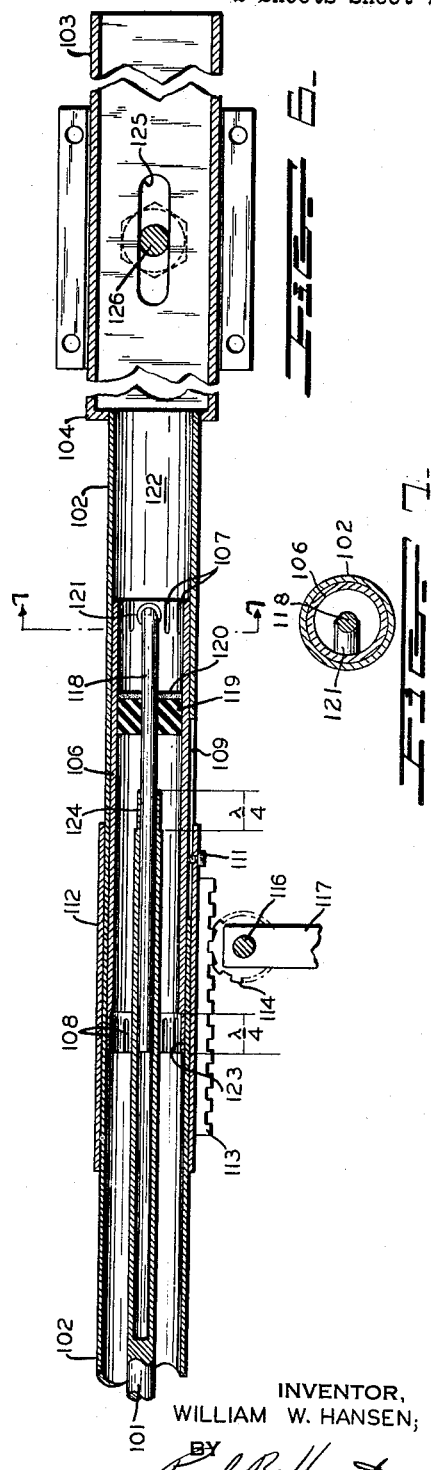

2,514,544

UNITED STATES PATENT OFFICE 2,514,544

HIGH-FREQUENCY ATTENUATING DEVICE

William W. Hansen, Garden City, N. Y., assignor to The Sperry Corporation, a corporation of Delaware Application July 25, 1942, Serial No. 452,319

25 Claims. (Cl. 178—44)

The present invention relates to devices for attenuating high frequency electromagnetic energy and especially to devices adapted for use in concentric transmission line systems or with wave guide systems.

In many high frequency systems it is necessary or desirable to attenuate the energy derived from an ultra high frequency source by a predetermined amount. Usually such high frequency systems utilize concentric transmission lines or wave guides for the transmission of energy between various parts of the system. It is therefore desirable to provide similar types of apparatus for effecting the desired attenuation.

Special provision must also be made to suitably match the attenuating device to the rest of the system in order not to produce undesired wave reflections and standing waves, resulting in well known harmful effects.

In addition, it is desirable to provide attenuating devices which will offer impedances substantially the same as the characteristic impedances of the concentric transmission lines or wave guides to which they are connected, when seen from either end, whereby the device may be connected in either sense to its source and its load without impedance mismatch.

It is also desirable to provide adjustability for such attenuators, whereby they may be varied to satisfy the requirements of the particular use.

Accordingly, it is an object of the present invention to provide improved high frequency attenuating devices incorporating special provisions for eliminating wave reflections and for matching the impedance of the attenuator to the impedances of the other devices connected thereto.

It is another object of the present invention to provide improved high frequency attenuating devices which are relatively insensitive to small changes in frequency.

It is a further object of the present invention to provide improved attenuating devices in which the amounts of attenuation produced may be suitably adjusted, preferably in a linear fashion.

It is still another object of the present invention to provide improved attenuating devices which may be connected directly to concentric line utilization or source devices.

It is a still further object of the present invention to provide improved attenuating devices which may be connected between a wave guide device and a concentric line device.

Other objects and advantages will become apparent from the specification, taken in connection with the accompanying drawings wherein the invention is embodied in concrete form.

In the drawings:

Fig. 1 shows a longitudinal view partly in cross-section of a form of concentric-line attenuator, utilizing an adjustable length wave guide dimensioned below cut-off for producing values of attenuation linearly variable with the longitudinal setting of the device.

Figs. 2, 3, 4 and 5 show different modifications of the device of Fig. 1.

Fig. 6 shows a longitudinal view partly in cross-section of an attenuator device similar to that of Fig. 4 but adapted to be connected between a concentric transmission line device and a wave guide device.

Fig. 7 is a cross-sectional view taken in the plane indicated at 7—7 in Fig. 6.

Referring to the drawings:

Fig. 1 illustrates a variable attenuator wherein attenuation is produced by means of a circular wave guide section having a diameter smaller than that required to produce transmission of the electromagnetic waves therealong. That is, the cross-section is smaller than the cut-off cross-section at the operating frequency. Thus, as shown in Fig. 1, a wave guide section 61 is provided which is supplied with energy by means of a suitable antenna or energy coupling device 62 formed as a continuation of a concentric line having an outer conductor 63 preferably integral with the boundary of wave guide section 61 and having an inner conductor 64 preferably integral with or joined to the antenna 62. A suitable coupling or terminal device 66 for connecting the present attenuator to any other high frequency devices may be provided.

Antenna 62 is preferably formed of a material having appreciable resistance, such as carbon, in order to avoid resonant and frequency-responsive effects therein, and thereby to excite the wave guide chamber 61 with electromagnetic energy. This energy cannot be projected along the wave guide section 61 because of its small size, so that no travelling wave effects are produced. The electric field within wave guide 61 will therefore be stationary. A portion of this energy may be picked up by a similar antenna device 68 which is made axially translatable along the device by means of its mounting within a sleeve 69 sliding within conductor 63.

One method of producing convenient adjustment of sleeve 69 within conductor 63 is shown in Fig. 1 and it comprises a pair of slots 70 and 71 formed in outer conductor 63. A pair of pins 72, 73 passes through the slots 70, 71 and are fastened to sleeve 69. Pins 72, 73 are slidably positioned within an annular groove 74 of a travelling nut 76 engaging a threaded portion 77 of conductor 63 coextensive with slots 70, 71. In this manner, by rotation of nut 76, pins 72, 73 and thereby sleeve 69, may be axially moved within outer conductor 63.

It may be shown that the decibel attenuation produced by a device of the present type having a length much larger than its radius will vary linearly with the length of the chamber 61.

In order to improve the operation of such a device as that of Fig. 1, the antennae 62—68 thereof may be modified as shown in Fig. 2. In this case, each of these antennae comprises a flat conducting disc such as 78 mounted concentrically on inner conductor 64 and separated from a ring 79 fixed to outer conductor 63 by a small annular gap 81. A pick-up antenna may be formed similarly from a disc 82 fixed to a conducting tube 83 slidably engaging with inner conductor 65 of the stationary portion of the device. Inner conductor 83 is concentrically mounted within sleeve 69 by means of a spacer such as 84. An annular ring 86, similar to 79, is also fixed to sleeve 69 and cooperates with disc 82 in the same manner as does ring 79 with disc 78. Sleeve 69 may be adjusted longitudinally of the device in the same manner as described with respect to Fig. 1.

In order to further minimize the effect of impedance mismatch at the sliding joint, conductor 83 terminates at a quarter-wavelength distance within the outer edge of sleeve 69 and the diameters of conductors 65, 83 and sleeve 69 are so chosen that the characteristic impedance of the quarter-wave line section 65—69 forms the geometric mean between the characteristic impedances of the line sections 65—63 and 83—69. In this way, this integrally built-in quarter-wave section provides an impedance-matching device for efficiently coupling the sliding portion of the device with the fixed portion of the device without impedance mismatch or wave reflections.

The attenuation produced by the device of Fig. 2 may be expressed by the equation $$A = (z+k)\frac{41.8}{2a}\sqrt{1-\left(\frac{2.61a}{\lambda}\right)^2}$$

wherein A is the attenuation in decibels, $z$ is the length of the cavity 61 as measured between the discs 78 and 82, $k$ is an empirically determined constant, $a$ is the inner radius of outer conductor 63, and $\lambda$ is the operating wavelength. In this device of Fig. 2 the energy supplied, for example, from the left, serves to set up a fixed electromagnetic field within the chamber 61, which field progressively decreases in intensity toward the right. Disc 82 and ring 86 serve to pick up energy from the adjustable right end of chamber 61, at which point the field intensity is considerably and adjustably weaker, whereby an effective attenuation is obtained in accordance with the above equation.

Since only a portion of the energy entering from the left is abstracted from the right, serious wave reflections producing standing waves would be obtained. In order to avoid this, suitable terminating resistors 87, 88 may be provided. These resistors may comprise resistive coatings on the surface of insulating spacers 75 and 84, respectively, or any other suitable concentric line resistors. Preferably these resistors are chosen to be of such a value as to fully terminate the lines so that the impedance viewed from either end of the device will remain substantially the characteristic impedance of lines 65—63 or 64—63, which are selected to be of equal characteristic impedance. Such terminating impedances could also be used with the device of Fig. 1.

Fig. 3 shows still another modification of wave guide attenuator similar in principle to that of Figs. 1 and 2. In this instance, electromagnetic energy is supplied to the adjustable wave guide chamber 61' which is in this case of rectangular cross-section and dimensioned below cut-off, by means of an antenna 91 positioned transversely of the short dimension of the rectangular chamber 61'. A stationary high frequency electric field is thereby set up extending transversely of the wave guide and decreasing in intensity to the right. At the other end of the chamber 61' a further antenna member 92 picks up electromagnetic energy, which is now greatly decreased in intensity, and this attenuated energy is then led to the output concentric line section 93 in a manner similar to that in the other modifications. Preferably, terminating resistors 94, 96 are provided in this instance also.

The attenuation in this modification may be given by the formula $$A = (z+k)\frac{27.3}{2a}\sqrt{1-\left(\frac{4a}{\lambda}\right)^2}$$

where the various symbols have the same meaning as above, $a$ in this case being half the dimension of the rectangular wave guide of Fig. 3 in a direction perpendicular to the plane of the paper. However, $k$ here may have a different value.

Fig. 4 shows another modification similar to those above, in which the adjustable circular wave guide chamber 61 is magnetically excited by means of a loop 98 formed by a connection between the inner conductor 64 and the outer conductor 63 of the device. A terminating resistor 87 is supplied here also. Loop 98, when the left end of the device is connected to a suitable source of energy, excites chamber 61 and sets up an electromagnetic field therein whose magnetic field component decreases toward the right. This decreased field intensity is picked up by a second loop 99, similar to loop 98, and transfers the energy from chamber 61 to the output at the right.

Loop 99 is made adjustable within conductor 63 by being fixed to sleeve 69, which may be adjustable along conductor 63 in the same manner shown in Fig. 2. The terminating resistor 88 is also supplied here.

The attenuation here may be given the formula $$A = (z+k)\frac{32.0}{2a}\sqrt{1-\left(\frac{3.41a}{\lambda}\right)^2}$$

where the symbols have the same meaning as in Fig. 2. However, $k$ here may have a different value than in Fig. 2.

Fig. 5 shows a modification of the device of Fig. 2 in which the rings 79 and 86 have been omitted and the discs 78 and 82 have been changed in form into spherical segments 78' and 82' as shown. It has been found that this type of construction extends the range of the device by permitting smaller attenuations without changing the substantially linear variation of attenuation with spacing of the antennae 78' and 82'. Otherwise this modification is the same as Fig. 2.

Fig. 6 shows a longitudinal cross-sectional view of a device similar to that of Fig. 4 but suitable for connection between a concentric line such as that formed by inner conductor 101 and outer conductor 102 and a wave guide illustrated in this instance as being a rectangular wave guide 103 having its longer transverse dimension in the plane of the figure.

Wave guide 103 is connected at one end 104, to the outer circular conductor 102 forming the main body of the device. Slidably mounted within conductor 102 is a sleeve 106 having spring fingers such as 107 and 108 at either end for producing effective sliding electrical contact between the ends of sleeve 106 and the inner wall of conductor 102.

Conductor 102 is provided with a longitudinally extending slot 109 through which passes a pin or screw 111 fixed to sleeve 106. Sliding on the outside of conductor 102 is an outer sleeve 112 which is also fixed to pin 111 whereby it moves together with the inner sleeve 106. Rack 113 is fixed to outer sleeve 112 and cooperates with a pinion 114 driven from a shaft 116 whereby suitable actuation of shaft 116, as by a manual control knob (not shown) will produce translational motion of rack 113 and sleeves 106 and 112 longitudinally of the device. Shaft 116 is preferably journaled within a supporting post 117 mounted on the same support as the conductor 102.

Inner conductor 101 of the concentric transmission line 101, 102 is preferably made hollow for at least a portion of its length, and thereby slidingly receives a conductor 118 supported concentrically within inner sleeve 106 by means of an insulating support 119, whereby conductor 118 cooperates with sleeve 106 to form a concentric line section therewith. Conductor 118 terminates at one end in a radially extending portion 121 connected to inner sleeve 106 and thereby forming an inductive loop termination for the concentric transmission line 118—106 similar to that shown in Fig. 4.

It will be clear, therefore, that energy fed into line 101—102 will set up an electromagnetic field within the space 122 between loop 121 and wave guide 103. The diameter of outer conductor 102 is preferably chosen to be smaller than the minimum dimension required to support electromagnetic waves at the particular frequency of operation when acting as a wave guide. Accordingly, the energy of line 101—102 will set up a stationary electromagnetic field within cavity 122 by virtue of the loop 121. The field intensity which is picked up by wave guide 103 will depend upon the distance between loop 121 and the end 104 of wave guide 103. This is adjustable by means of the arrangement already described and, accordingly, the attenuation thereby produced may be adjusted in the manner similar to that in Fig. 4.

It is to be noted that the adjusting means of Fig. 6 may also be used in Figs. 1–5, and vice versa.

Insulating spacer 119 preferably carries a terminating resistance 120 which may be of the type similar to that disclosed above to terminate the concentric transmission line to the left thereof. In order to avoid undesirable reflections and standing waves produced by the sliding joints just described, the left end 123 of the inner sleeve 106 is reduced in wall thickness by an amount whereby the concentric line section 101, 123 will have a characteristic impedance which is the geometric mean between the characteristic impedances of the line sections 101—102 to the left thereof and 101—106 to the right thereof. This reduced thickness portion 123 is made to have a length equal to one-quarter-wavelength of the operating frequency in free space, and thereby, in the manner described with respect to Fig. 2, provides an integrally formed quarter-wave matching section at the joint to substantially eliminate reflections and standing waves at this joint. In the same manner, the right-most end 124 of inner conductor 101 has a reduced wall thickness for a quarter wavelength, whereby the concentric line section 124—106 will have a characteristic impedance which is the geometric mean between the characteristic impedances of the line section 101—106 to the left thereof and of concentric line section 118—106 to the right thereof to prevent undesired reflections at this sliding joint.

The effect of the sliding joint between the right end of sleeve 106 and outer conductor 102 is immaterial since the terminating resistance 120 effectively terminates the line to the left thereof and prevents wave reflections therein.

Preferably the wave guide 103 is also terminated as by a resistance formed by a carbon rod 126 extending parallel to the electric vector in the wave guide 103, that is, parallel to the shorter cross-sectional dimension and perpendicular to the plane of the figure.

This resistor is preferably positioned at the center of the longer cross-sectional dimension so as to be at the point of highest electric field intensity whereby it may be most effective as a terminating impedance without preventing transfer of energy. It will be clear that the size of the carbon rod is chosen to provide the proper value of terminating impedance.

The terminating resistor may be made longitudinally adjustable along wave guide 103, as by means of slot 125, and is preferably positioned a quarter-wavelength from end 104 of wave guide 103 to provide the most effective termination of the wave guide and to most efficiently prevent standing waves to the right of the termination position.

It will be clear that each of the devices of the present invention will offer the same impedance when viewed in either direction, and hence are entirely bilateral in character.

As many changes could be made in the above construction and many apparently widely different embodiments of this invention could be made without departing from the scope thereof, it is intended that all matter contained in the above description and shown in the accompanying drawings shall be interpreted as illustrative and not in a limiting sense.

What is claimed is:

1. An attenuator for ultra high frequency energy comprising an adjustable length wave guide section having a cross-section less than the cut-off cross-section at the operating frequency, adjustable coaxial line coupling means for supplying said wave guide section with high frequency energy at one end thereof and for adjusting the effective length of said wave guide section, said coaxial line coupling means comprising a tubular outer conductor telescopically axially slidable in said wave guide section and an inner conductor coaxial with said tubular outer conductor and with said wave guide section and including a radially projecting conductive portion extending outward toward the end of said tubular outer conductor and further coupling means for abstracting energy from the other end thereof, whereby variable attenuation may be interposed to the flow of said energy according to the effective length of said section.

2. A concentric line high frequency attenuating device comprising a pair of concentric transmission line end sections, an adjustable length wave guide section having a cross-section less than the cut-off cross-section at the operating frequency thereof, said wave guide section comprising a section of tubular conductor, means for coupling each of said line sections to said wave guide, said coupling means comprising a coupling device fixedly coupled to said conductor, and a second coupling device coupled to said tubular conductor adjustably therealong.

3. A high frequency attenuating device comprising a uniformly extending tubular conductor having a cross-section smaller than the cut-off cross-section at the operating frequency, coupling means for effecting interchange of energy at said frequency with said tubular conductor at one end thereof comprising a coaxial line section, said coupling means having its inner conductor extending within said tubular conductor and terminating therein, means for effecting interchange of energy at the other end of said conductor, and means for slidably adjusting the position of said coaxial line section coupling means within said tubular conductor to vary the attenuation produced thereby.

4. A high frequency attenuating device as in claim 3, further including means for properly terminating said device at each end.

5. A high frequency attenuating device comprising a tubular conductor having a cross-section smaller than the cut-off cross-section at the operating frequency thereof, means for coupling energy of said frequency to one end of said conductor and means for abstracting energy from the other end of said conductor, one of said two last-named means comprising an apertured disc relatively fixed with respect to said conductor, and an inner conductor concentric with said tubular conductor and said disc, said inner conductor extending at least to said disc, whereby said inner and tubular conductors comprise a concentric transmission line adapted to be coupled to other apparatus; and wherein the other of said two last-named means comprises a sleeve slidably engaged within said tubular conductor, an apertured disc fixed to said sleeve, an inner conductor insulatingly supported concentrically within said sleeve and extending at least to said disc to be coupled to the wave guide space within said tubular conductor, and means for adjusting said sleeve along said tubular conductor to adjust the attenuation offered by said device.

6. A high frequency attenuating device comprising a hollow conductor having a cross-section smaller than the cut-off cross-section at the operating frequency thereof, means for coupling energy of said frequency to one end of said conductor, means for abstracting energy from the other end of said conductor, one of said two last-named means comprising an annular ring fixed within said conductor, an inner conductor insulatingly supported within said tubular conductor, and a disc fixed to said inner conductor substantially coplanar with said ring, whereby energy applied between said tubular conductor and said inner conductor will be coupled by means of said disc and said ring to the space within said tubular conductor; and wherein further the other of said two last-named means comprises a sleeve slidingly mounted within said tubular conductor, a ring conductively fixed to the end of said sleeve juxtaposed to said first-named ring, an inner conductor concentrically supported within said sleeve, a further disc fixed to said last-named inner conductor and substantially coplanar with said last-named ring, whereby the concentric transmission line formed by said last-named inner conductor and said sleeve may be coupled to the space within said tubular conductor by means of said last-named disc and ring, and means for adjusting said sleeve along said inner conductor to thereby adjust the attenuation offered by said device.

7. A high frequency attenuating device comprising a hollow conductor having a cross-section smaller than the cut-off cross-section at the operating frequency thereof, means for coupling energy of said frequency to one end of said conductor comprising a concentric transmission line section having an inner conductor connected at one end to the outer conductor thereof to form an inductive loop termination for said section, means for abstracting energy from the other end of said conductor comprising a similar concentric transmission line section having an inner conductor connected to the outer conductor thereof to form an inductive loop energy coupling, and means for adjusting the effective separation of said loops to thereby adjust the attenuation offered by said device.

8. A high frequency attenuating device comprising a tubular conductor having a cross-section smaller than the cut-off cross-section at the operating frequency thereof, wave guide means for coupling energy of said frequency at one end of said conductor, and adjustable concentric line means for coupling energy at the other end of said conductor and adjustably along said conductor, the adjustment of said concentric line means along said conductor providing adjustment of the attenuation offered by said device.

9. A high frequency attenuating device comprising a hollow conductor having a cross-section smaller than the cut-off cross-section at the operating frequency, a coaxial line section terminated by a dissipative resistive element, means coupling said section to one end of said conductor whereby said section may serve as input to said conductor, means for abstracting energy from the other end of said conductor, and means for adjusting the position of said coupling means along said conductor to vary the attenuation produced thereby.

10. An attenuator for ultra high frequency energy comprising a wave guide section having a cross-section less than the cut-off cross-section at the operating frequency, a coaxial line, and adjustable means for coupling said coaxial line to said wave guide section to adjust the length of said section, said coaxial line having an inner conductor, portions of said inner conductor being of unequal diameter to produce impedance matching.

11. The attenuator defined in claim 10 wherein one of said portions of the inner conductor is of length substantially equal to a quarter wavelength at the operating frequency.

12. The attenuator defined in claim 10 wherein said inner conductor comprises a body part of predetermined diameter and a terminal part of substantially reduced diameter, said terminal part being of length substantially equal to a quarter wavelength at the operating frequency.

13. A high frequency attenuating device comprising a tubular conductor having a cross-section smaller than the cut-off cross-section at the operating frequency thereof, means for coupling energy of said frequency to one end of said conductor, said coupling means comprising a coaxial line terminated in an inductive loop, said terminating loop being slidably adjustable within said tubular conductor to vary the amount of attenuation produced thereby.

14. A high frequency attenuating device comprising a hollow conductor having a cross-section smaller than the cut-off cross-section at the operating frequency thereof, a coaxial line terminated in an inductive loop, said coaxial line being slidably cooperable with said conductor whereby variable coupling with an electromagnetic field therewithin is effected, and resistive means terminating said coaxial line to properly terminate said coaxial line thereby avoiding undesirable reflections therein.

15. High frequency attenuator apparatus comprising a hollow conductor adapted to contain an electromagnetic field and having a cross-section smaller than the cut-off cross-section at the operating frequency thereof, a coaxial line section disposed adjacent one end of said conductor and having an inductive loop termination for coupling with said field, said coaxial line section and said inductive loop termination being conjointly slidably engageable with said conductor for continuously varying the degree of insertion of said termination within said field, said coaxial line section having portions of its inner and outer conductors of different diametral ratios for suppressing undesired wave reflections therein.

16. A fixed-length high frequency attenuating device comprising a hollow wave guide conductor having a transverse dimension fixed at a value below cut-off at the operating frequency and input and output terminations spaced a predetermined fixed distance apart, and coaxial conductor means positioned in said wave guide conductor and movable relative to said conductor and each of said terminations for varying the effective length of said conductor whereby variations in the attenuation of the energy propagated between said termination is effected.

17. The attenuation device defined in claim 16 wherein one of said terminations is a coaxial transmission line section having a hollow inner conductor portion and an outer conductor portion, said portions being adapted to slidingly receive the inner and outer conductors, respectively, of said coaxial conductor means.

18. The attenuating device defined in claim 16 wherein one of said terminations is a coaxial transmission line section having a hollow inner conductor portion and an outer conductor portion, said portions being adapted to slidingly receive the inner and outer conductors, respectively, of said coaxial means, and a high frequency coupling at the end of said coaxial conductor means remote from said coaxial transmission line section adapted to be controllably disposed in a desired portion of said wave guide conductor in accordance with a predetermined position of said coaxial conductor means.

19. The attenuating device defined in claim 16 wherein one of said terminations is a hollow rectangular wave guide adapted to contain travelling electromagnetic waves of which the intensity at the junction between said below cut-off wave guide and said rectangular wave guide depends on the effective length of said below cut-off wave guide, and adjustable terminating means in said rectangular wave guide for insuring efficient propagation of energy through said rectangular wave guide.

20. A high frequency attenuating device comprising a hollow wave guide conductor having a transverse dimension corresponding to a value below cut-off at the operating frequency of the device, a coaxial conductor input coupling telescopingly mounted at one end of said wave guide conductor, said coupling including an inductive loop element connected between the inner and outer conductors of said coaxial conductor and slidably adjustable within said wave guide conductor to vary the effective length thereof, hollow wave energy propagation means fixedly connected at the other end of said wave guide conductor, whereby, upon selective positioning of said coaxial coupling with respect to said wave guide conductor, predetermined amounts of attenuation are introduced in said device corresponding to selected lengths of said wave guide conductor.

21. Ultra high frequency attenuator apparatus comprising a wave guide section having a cross-section less than the cut-off cross-section at the operating frequency, energy conducting means coupled to one end of said wave guide section, a slidably adjustable coaxial line section serving as coupling to said wave guide section at the other end thereof, said coaxial line section having an outer conductor slidably mounted and movable within said wave guide, and also having an inner conductor connected to said outer conductor by an inductive loop within said guide, said coaxial line section also serving as means for varying the length of said wave guide section to vary the amount of attenuation produced therein.

22. An ultra high frequency attenuator, comprising a wave guide having a cross-section less than the cut-off cross-section at the operating frequency, means fixedly connected at one end of said wave guide and coupling said attenuator to external apparatus, a second coupling means having a conducting wall member fixedly connected to the conducting wall of said wave guide at the other end thereof for coupling said attenuator to further external apparatus, and electrical conducting means comprising a coaxial line section having an outer conductor slidably engaging said wave guide section and an inner conductor connected to said outer conductor by an inductive loop within said wave guide, said second coupling means comprising a further coaxial line section fixed with respect to said wave guide and having outer and inner conductors respectively slidably engaging said first-named outer and inner conductors, whereby said first coaxial line section may be adjusted relative to said wave guide and further coaxial line section to vary the effective length of said wave guide section.

23. Ultra high frequency attenuator apparatus comprising a wave guide section having a cross-section less than the cut-off cross-section at the operating frequency, a coaxial line section having outer and inner conductors relatively fixed with respect to said wave guide section, and means for adjustably coupling said sections and for adjusting the length of said wave guide section to vary the amount of attenuation produced therein, comprising a further coaxial line section having outer and inner conductors respectively slidably engaging the outer and inner conductors of said first coaxial line section at one end of said further section, and also having an inductive loop connecting its outer and inner conductors at the other end thereof within said wave guide, said further coaxial line section outer conductor being slidably engaged with said wave guide, whereby said loop may be adjusted along said wave guide without disturbing the fixed relation of said guide and said first coaxial line section.

24. A high frequency attenuation device, comprising a uniformly extending tubular conductor having a cross-section smaller than the cut-off cross-section at the operating frequency, coupling means at one end of said tubular conductor comprising a coaxial line section for connecting said tubular conductor to external apparatus, said coaxial line section having its inner conductor extending within said tubular conductor and terminating therein, coupling means at the other end of said conductor for connecting other external apparatus thereto, means for slidably adjusting the position of said coaxial line section coupling means within said tubular conductor to vary the attenuation produced thereby, and means for terminating each of said coupling means for suppressing undesired wave reflections therein.

25. A high frequency attenuating device, comprising a uniformly extending tubular conductor having a cross-section smaller than the cut-off cross-section at the operating frequency, coupling means for effecting interchange of energy at said frequency with said tubular conductor at one end thereof comprising a coaxial line section, said coupling means having its inner conductor extending within said tubular conductor and terminating therein, means for effecting interchange of energy at the other end of said conductor, and means for slidably adjusting the position of said coaxial line section coupling means within said tubular conductor to vary the attenuation produced thereby, said coaxial line coupling means having portions of its inner and outer conductors of different diametral ratios for suppressing undesired wave reflections therein.

WILLIAM W. HANSEN.

REFERENCES CITED

The following references are of record in the file of this patent:

UNITED STATES PATENTS

| Number | Name | Date |
|---|---|---|
| 1,957,538 | Jensen | May 8, 1934 |
| 2,060,042 | Cowan | Nov. 10, 1936 |
| 2,088,749 | King | Aug. 3, 1937 |
| 2,129,712 | Southworth | Sept. 13, 1938 |
| 2,147,717 | Schelkunoff | Feb. 21, 1939 |
| 2,151,157 | Schelkunoff | Mar. 21, 1939 |
| 2,197,122 | Bowen | Apr. 16, 1940 |
| 2,197,123 | King | Apr. 16, 1940 |
| 2,206,683 | Wolff | July 2, 1940 |
| 2,232,179 | King | Feb. 18, 1941 |
| 2,273,465 | Carter | Feb. 17, 1942 |

FOREIGN PATENTS

| Number | Country | Date |
|---|---|---|
| 660,564 | Germany | May 28, 1938 |